United States Patent

[11] 3,602,846

[72] Inventor Gerhard G. Hauser
Princeton, N.J.
[21] Appl. No. 841,269
[22] Filed July 14, 1969
[45] Patented Aug. 31, 1971
[73] Assignee Pulse Engineering, Inc.
San Diego, Calif.

[54] DELAY LINE
3 Claims, 14 Drawing Figs.

[52] U.S. Cl. .......... 333/29,
174/52 PE, 174/DIG. 3, 317/101 CC, 333/70 S
[51] Int. Cl. .......... H03h 7/32,
H05k 5/06
[50] Field of Search .......... 333/29, 23,
70 T, 70 S; 317/101; 174/52 PE

[56] References Cited

UNITED STATES PATENTS

| | | | |
|---|---|---|---|
| 1,641,432 | 9/1927 | Hubbard .......... | 333/29 X |
| 1,989,082 | 1/1935 | Colton et al. .......... | 333/29 X |
| 2,390,563 | 12/1945 | Tawney .......... | 333/29 |
| 3,466,574 | 9/1969 | Rutishauser .......... | 333/31 X |

*Primary Examiner*—Herman Karl Saalbach
*Assistant Examiner*—Marvin Nussbaum
*Attorney*—Flehr, Hohbach, Test, Albritton & Herbert

ABSTRACT: A delay line including a plurality of capacitors and a tapped inductor having mutually coupled sections disposed on opposite sides of and connected to a lead assembly, all encapsulated to form a delay line having a plurality of leads to provide selective delay.

INVENTOR.
GERHARD G. HAUSER
BY
Flehr, Hohbach, Test, Albritton & Herbert
ATTORNEYS INVENTOR.
GERHARD G. HAUSER
BY Flehr, Hohbach, Test, Albritton & Herbert
ATTORNEYS

DELAY LINE

BACKGROUND OF THE INVENTION

This invention relates generally to electrical delay and pulse forming lines and more particularly to compact encapsulated delay lines useful in connection with miniaturized circuits.

Delay lines and pulse forming lines may take various forms as, for example, transmission line cables, and lumped and distributed constant networks including inductive and capacitive components. One form of delay line comprises a series of mutually coupled inductances shorted therealong by capacitors. Generally, this type of line becomes bulky and is not useful in miniaturized circuit applications.

SUMMARY OF THE INVENTION AND OBJECTS

A delay line comprising an elongated common conductor including a plurality of spaced conductors extending outwardly therefrom with one end spaced from the common conductor. A capacitor is connected between said one end of each conductor and the common conductor to provide capacitance therebetween. An elongated inductor having a plurality of taps is spaced from said outer conductor with the taps connected at one end of said spaced conductors.

It is an object of the present invention to provide a compact delay line having a plurality of output terminals for selecting desired delays.

It is another object of the present invention to provide a delay line which is useful in miniaturized circuit applications.

It is another object of the present invention to provide a delay line which is simple in construction and easy to manufacture.

These and other objects of the invention will become more clearly apparent from the following description taken in connection with the accompanying drawings.

DESCRIPTION OF THE PREFERRED EMBODIMENT

Figure 7:
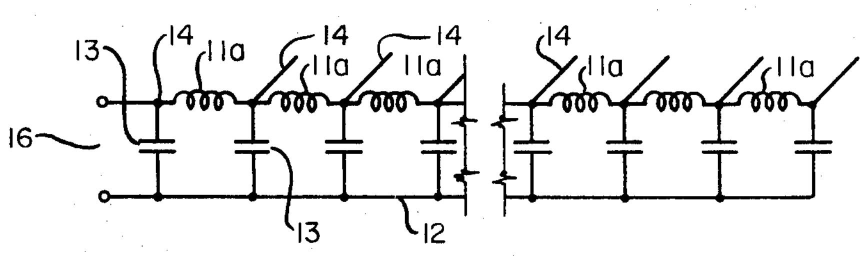
FIG. 7 is a circuit diagram of the delay line shown in FIGS. 1–4 showing the plurality of taps to provide selective delay.

The circuit diagram of FIG. 7 shows a delay line including a series of mutually coupled inductors 11 shunted to the common line 12 by a plurality of capacitors 13. The delay line includes a plurality of output taps or terminals 14 whereby connection to the selected terminals will provide the desired delay between the selected tap and the input 16.

In accordance with the present invention, a delay line of the type described is assembled and encapsulated in a compact package 17 which may be molded from a suitable plastic. The delay line includes a plurality of taps represented by the leads 14. As shown, the leads depend downwardly from the package for connection into an associated circuit board such as a printed circuit.

Figure 1:
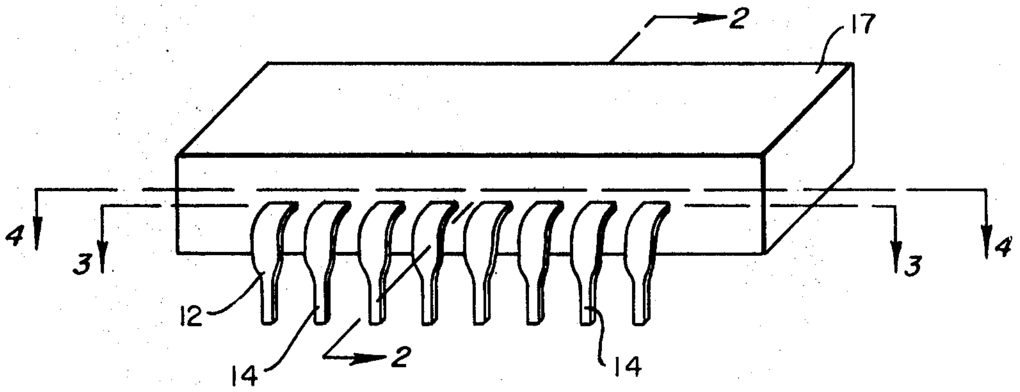
FIG. 1 is a perspective view of a delay line in accordance with the invention.
Figure 2:
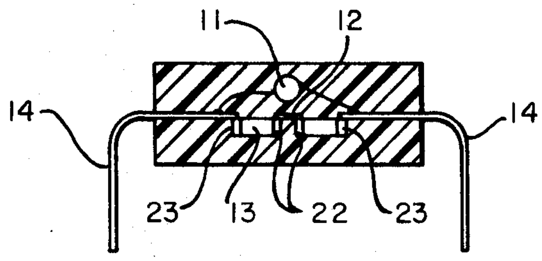
FIG. 2 is a sectional view taken along the line 2—2 showing the delay line components within the package.
Figure 3:
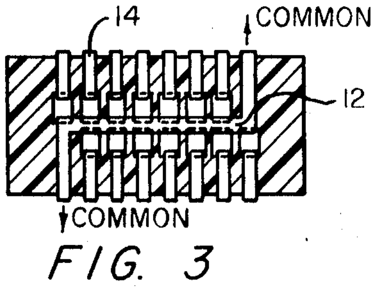
FIG. 3 is a sectional view taken along the line 3—3 of FIG. 1 and showing the delay line taps and central conductor.

Referring particularly to FIGS. 2 and 3, the plurality of leads 14 are formed of flat strips of material which extend inwardly towards common line 12 disposed along the center line of the package 17.

Figure 5:
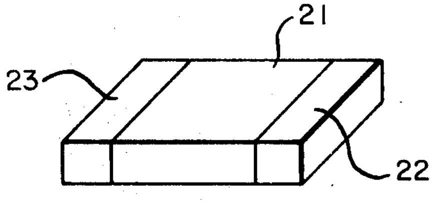
FIG. 5 is a perspective view of a typical capacitor for use in connection with the delay line shown in FIGS. 1–4.
Figure 4:
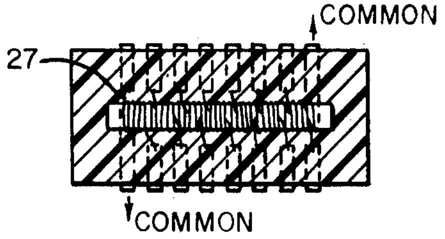
FIG. 4 is a sectional view taken along the line 4—4 of FIG. 1 showing the tapped wound inductor connected to the conductors.
Figure 6:
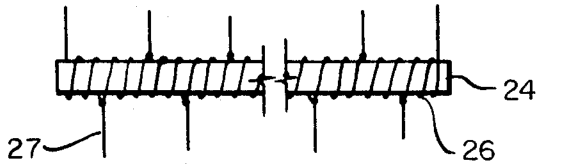
FIG. 6 is an enlarged view of the tapped inductor employed in the delay line of FIGS. 1–4.

A small flat capacitor 13 is connected between one end of each of the conductors 14 and the common conductor 12. These capacitors may be of the type shown in FIG. 5 and include a body 21 having conductive ends 22 and 23. Capacitors of this type are commercially available and are not described in detail herein. The capacitors have the conductive ends 22 and 23 connected to the common line 12 and the end of the adjacent conductor 14. Disposed on the opposite side of the common conductor 12 is an inductor 11. A suitable inductor is shown in FIG. 6. The inductor includes a core 24 which carries coil 26 which is tapped to provide a plurality of mutually coupled sections 11*a*. The taps 27 are then connected to the ends of the associated conductors 14. The complete assembly is encapsulated to form a compactly packaged delay line. The amount of delay may be selected by selecting the number of sections between the input to the common line 12 and the selected output terminal 14.

Figure 8A:
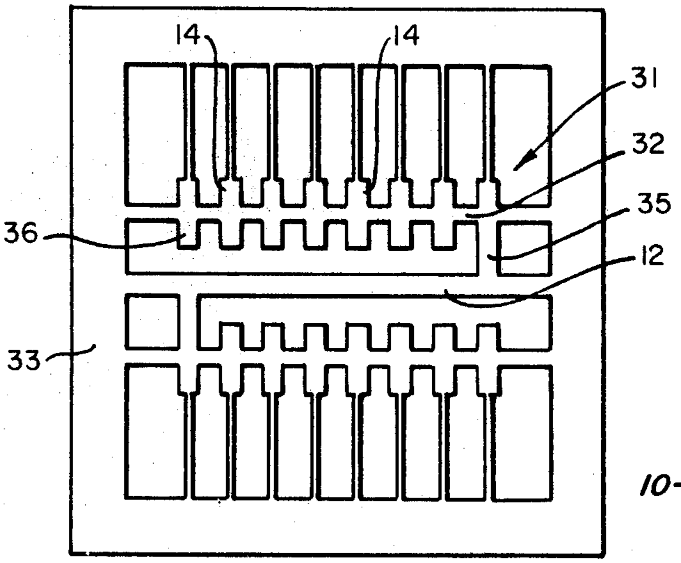
FIGS. 8A–8E show the steps in manufacturing a delay line of the type shown in FIGS. 1–4.

The manufacturer of a delay line of this type is facilitated by use of a lead frame structure such as depicted in FIG. 8A which includes a conductive sheet 31 which has been stamped out to define the plurality of conductors 14 supported in spaced relationship by means of the connection 32 having its end supported by frame 33. The central conductor 12 is supported at its ends by frame 33 and is also supported by connection 35. Thus, the parts of the lead frame are held in position for application of components.

Figure 8B:
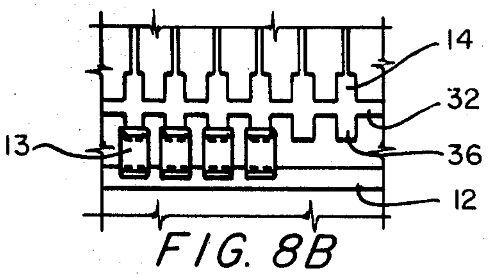
Figure 8C:
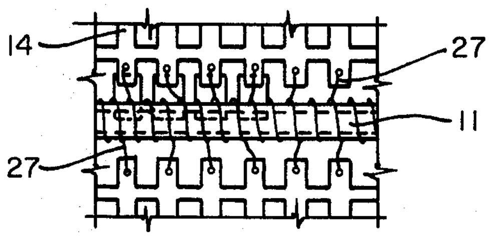
Figure 10:
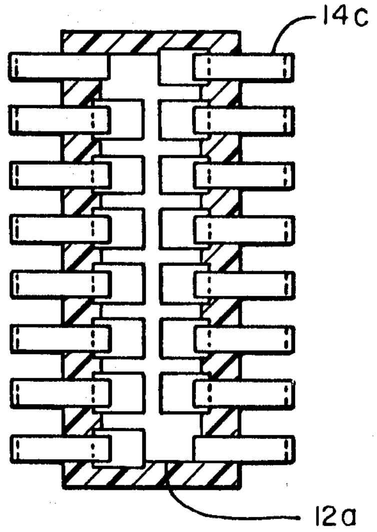
FIG. 10 is a sectional view taken along the line 10—10 of FIG. 9.

Capacitors are connected between the ends 36 of the conductors and the common terminal 12 as, for example, by soldering (FIG. 8B). The tapped inductor is then placed on the opposite side of the lead frame and a connection is made between the taps 27 and the ends of the conductors 14 as, for example, by soldering (FIG. 8C).

Figure 8D:
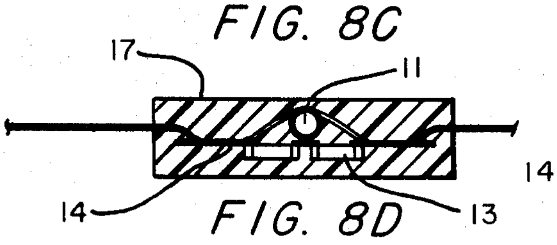
Figure 8E:
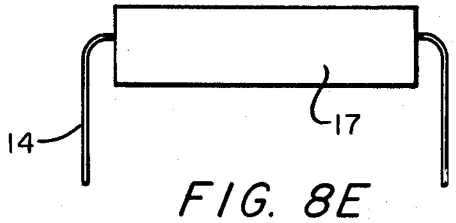

After the complete assembly has been wired and tested, it is placed in an injection molding machine wherein the assembly is encapsulated by injection molding to form plastic package 17 (FIG. 8D). Thereafter, by suitable etching, machining or other well known technique, the frame 33 and connection 32 are removed leaving a plurality of outwardly extending leads 14 which may be bent downwardly (FIG. 8E).

It is seen that by using a flat lead frame assembly the components can be easily and efficiently connected to the conductors 12, 14 and tested before the assembly is encapsulated.

Figure 9:
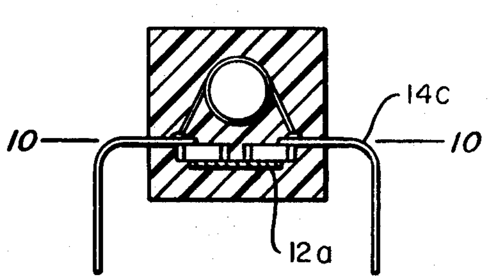
FIG. 9 is a sectional view of another delay line incorporating the present invention.

An alternative embodiment is to form the common conductor as a relatively wide member as shown at 12*a*, FIG. 9. A plurality of dielectric chips 13 are connected to the strip near its outer edge. The lead frame includes only the outwardly extending leads 14*c* and is placed over the capacitors and connected to form a sandwich including the leads on one side and the common conductor on the other side. The inductor is of the type previously described and is connected to the conductors 14*a* forming the leads or terminals. The complete assembly is then encapsulated as previously described to form a compact delay line package.

I claim:

1. A delay line comprising an elongated flat strip of conductive material forming a common conductor, a plurality of flat strips of conductive material forming spaced conductors extending outwardly from said conductor with one end alongside said common conductor and spaced therefrom, a flat capacitor disposed in the space between said common conductor and said strips and connected between said one end of each conductor and said common conductor, the flat capacitor and the flat strips forming the common conductor and the spaced conductors being arranged in planes which are substantially parallel to each other, an elongated inductor spaced from said common conductor, a plurality of leads connected between the one end of said conductors and spaced taps formed along and connected to said elongated inductor whereby to provide a delay line having a plurality of delay sections adapted to be selectively connected into an associated circuit, and means encapsulating said delay line structure.

2. A delay as in claim 1 wherein said flat strips of conductive material forming spaced conductors are spaced above the flat strip forming the common conductor and the capacitors are disposed above the flat strip forming the common conductor and below the flat strips forming the spaced conductors.

3. A delay line comprising an elongated flat strip of conductive material forming a common conductor, a plurality of flat strips of conductive material forming spaced conductors extending outwardly from said conductor with one end alongside said common conductor and spaced therefrom, the flat strips forming said common conductor and said spaced conductors being arranged in a single plane, a flat capacitor disposed on one side of said single plane in the space between said common conductor and said strips and connected between said one end of each conductor and said common conductor, an elongated inductor spaced from said common conductor, a plurality of leads connected between the one end of said conductors and spaced taps formed along and connected to said elongated inductor whereby to provide a delay line having a plurality of delay sections adapted to be selectively connected into an associated circuit, and means encapsulating said delay line structure.